United States Patent
Falquete

(10) Patent No.: US 12,227,711 B2
(45) Date of Patent: Feb. 18, 2025

(54) FORMULATION AND CETANE IMPROVEMENT BASED ON ORGANIC NITRATES FOR ALCOHOL-BASED RENEWABLE DIESEL FUEL

(71) Applicant: Marco Antonio Falquete, Curitiba (BR)

(72) Inventor: Marco Antonio Falquete, Curitiba (BR)

( * ) Notice: Subject to any disclaimer, the term of this patent is extended or adjusted under 35 U.S.C. 154(b) by 0 days.

(21) Appl. No.: 18/548,502

(22) PCT Filed: Feb. 25, 2022

(86) PCT No.: PCT/BR2022/050061
§ 371 (c)(1),
(2) Date: Aug. 31, 2023

(87) PCT Pub. No.: WO2022/183262
PCT Pub. Date: Sep. 9, 2022

(65) Prior Publication Data
US 2024/0166963 A1    May 23, 2024

(30) Foreign Application Priority Data
Mar. 2, 2021    (BR) .................... BR1020210040017

(51) Int. Cl.
*C10L 1/23*    (2006.01)
*C10L 1/02*    (2006.01)
*C10L 10/08*    (2006.01)
*C10L 10/12*    (2006.01)

(52) U.S. Cl.
CPC ................ *C10L 1/231* (2013.01); *C10L 1/02* (2013.01); *C10L 10/08* (2013.01); *C10L 10/12* (2013.01); *C10L 2270/026* (2013.01)

(58) Field of Classification Search
CPC .. C10L 1/231; C10L 1/02; C10L 10/08; C10L 10/12; C10L 2270/026
See application file for complete search history.

(56) References Cited

U.S. PATENT DOCUMENTS

| 2,378,466 A | 6/1945 | Curme, Jr. |
| 2013/0139430 A1 | 6/2013 | Fabre |

FOREIGN PATENT DOCUMENTS

| BR | PI1004630 A2 * | 6/2012 |
| EP | 0030429 A2 | 6/1981 |
| EP | 0080314 A1 | 6/1983 |
| EP | 0116197 A2 | 8/1984 |
| EP | 0313696 A1 | 5/1989 |
| KR | 20150084081 A | 7/2015 |

OTHER PUBLICATIONS

International Search Report and Written Opinion for PCT/BR2022/050061, mailed May 2, 2022.

* cited by examiner

*Primary Examiner* — Taiwo Oladapo
(74) *Attorney, Agent, or Firm* — Patenting Consulting Group; Roberto J. Rios

(57) ABSTRACT

Refers to a formulation of renewable diesel fuel, whose objective is to provide a fuel for the diesel cycle that is possible to produce by biotechnology methods from a renewable biological source, including fermentation processes of sugars or materials available in sugar and alcohol plants. In this way, the obtained fuel can be conventionally used as a substitute for diesel oil in urban or road transport vehicles and be an alternative option to diesel oil used in sugar and alcohol plants, which reduces fossil carbon emissions in the production cycle of sugar and alcohol, with the advantages of replacing fossil sources, reducing the emission of carbon compounds, adequate consumption, compatible cost, maintenance of the shelf life of the system components, greater safety and reduced evaporation losses.

6 Claims, No Drawings

FORMULATION AND CETANE IMPROVEMENT BASED ON ORGANIC NITRATES FOR ALCOHOL-BASED RENEWABLE DIESEL FUEL

The present patent refers to an improved formulation of renewable diesel fuel, whose objective is to provide a fuel for the diesel cycle that is possible to produce by biotechnology methods from a renewable biological source, including fermentation processes of sugars or materials available in sugar and alcohol plants. In this way, the obtained fuel can be conventionally used as a substitute for diesel oil in urban or road transport vehicles and be an alternative option to diesel oil used in sugar and alcohol plants, which reduces fossil carbon emissions in the production cycle of sugar and alcohol, with the advantages of replacing fossil sources, reducing the emission of carbon compounds, adequate consumption, compatible cost, maintenance of the shelf life of the system components, greater safety and reduced evaporation losses.

Compression-ignited internal combustion engines (diesel cycle engines) have been known since the pioneering work of Rudolph Diesel, who demonstrated the possibility and suitability of heat engines in which fuel ignition occurs by heating the air-fuel mixture caused only by compressing the mixture in the combustion chamber, without the need to use a spark generated by an electrical system, as occurs in spark ignition engines (Otto cycle engines). Diesel cycle engines are generally 30% more efficient in converting thermal energy into mechanical energy than Otto cycle engines of the same power. For this reason, they are widely used in trucks, buses, civil construction machines, agricultural machines, electricity generators, irrigation pumps, automobiles, trains and ships. Modern diesel engines, used mainly in passenger cars, have low emission of harmful gases. When compared to Otto engines of equivalent power, they present a reduction in carbon dioxide emissions, precisely because of the greater energy conversion efficiency. However, the vast majority of existing diesel engines use diesel oil, a fossil fuel that contributes to the greenhouse effect and emits harmful and polluting products, mainly particulate matter, nitrogen oxides and sulfur derivatives.

Currently, there is a clear trend towards the development of fuels of biological origin (biofuels), which have a production cycle in which at least part of the carbon emitted during the burning of a biofuel is recovered by the process of biological growth, in general by the atmospheric carbon capture in the process of photosynthesis. Agricultural production cycles, however, add carbon in various stages of the biofuel manufacturing process, in particular through the consumption of fossil diesel oil in agricultural machinery, trucks, and irrigation motor pumps. The production cycle of ethanol from sugarcane, for example, is one of the most efficient in capturing carbon, but uses diesel fuel intensively. One of the objectives of this invention is to provide a fuel for the diesel cycle that is possible to produce by biotechnology methods, including fermentation processes of sugars or materials available in sugar and alcohol plants. In this way, the fuel could be an alternative option to diesel oil used in sugar and alcohol plants, which reduces fossil carbon emissions in the sugar and alcohol production cycle.

Among biofuels, the most widely used is ethanol, in spark-ignition engines (Otto cycle), either as a component mixed with gasoline or as a relatively pure fuel. Ethanol has a high-octane rating, that is, an anti-knock characteristic suitable for spark ignition. In this way, it can provide the proper octane rating to gasoline, replacing tetraethyl lead, a toxic compound. When used in a mixture with gasoline, ethanol is anhydrous, since the presence of water prevents a stable mixture with gasoline. When used without another mixture in Otto cycle engines, ethanol is hydrated. Ethanol is used in several countries mixed with gasoline, arriving in Europe and the United States to represent 85% of the mixture with gasoline (E85). In Brazil, pure hydrated alcohol is widely used.

However, ethanol has some inherent disadvantages:

Ethanol has a low calorific value compared to gasoline. On average, the energy content of hydrated ethanol is only 70% of the energy content of gasoline with 22% ethanol (blend supplied to the Brazilian market).

Hydrated ethanol is more corrosive when compared to gasoline.

Technologies that allow the use of ethanol or alcohols in compression ignition engines (diesel cycle) include mixtures and emulsions of ethanol and/or other alcohols in diesel oil or petroleum fractions. Often, such mixtures or emulsions employ butanol or isobutanol as a co-solvent, an auxiliary with a polar character intermediary between ethanol and hydrocarbons, in order to increase the stability of the mixture.

The mixtures tried and taken to the market have problems of stability, since ethanol and diesel oil are not very miscible with each other. Many mixtures present separation problems sometime after mixing, problems that are aggravated by environmental conditions such as low temperatures, air humidity, etc. Problems of degradation of surfaces by cavitation and corrosion frequently occur, due to the physical separation between the components caused by the attrition efforts and dynamic pressure differences found in fuel pumping and injection systems. In addition, these mixtures still do not represent a completely renewable fuel, as they use fossil fuels in large proportions.

Another current technology is the mixture of additives to hydrated ethanol capable of increasing the explosiveness of ethanol, in order to allow its ignition by compression.

2-EHN and organic peroxides are conventionally used to increase the explosiveness of diesel oil, but not to add to ethanol, as their curves of added content vs. increase in the cetane number trend to an asymptote after 8%, but do not reach the cetane number of 42 required for proper ignition of diesel fuel or hydrous ethanol.

All organic nitrates present stability problems (acid or alkaline hydrolysis), mainly in the presence of water. Hydrated ethanol, due to its water content, has a tendency to hydrolyze, generating free acid that increases with the period of storage. It shows corrosion of the injector nozzles. Even in media without nitrates, durability is reduced by the presence of water vapor near the injection nozzle and exhaust valves. For this reason, the maintenance of hydrous ethanol systems demands less time between maintenances compared to diesel oil systems. For example, Scania's maintenance manual for the BEST project buses (BioEthanol for Sustainable Transportation) indicates injector nozzle change every 22,000 km, while the nozzle change in systems with diesel oil occurs every 120,000 km.

In addition to the durability problems inherent to hydrous ethanol, due to the great difference in calorific power between ethanol and diesel, there is an increase in consumption in L/h in the ratio L/h of ethanol/L/h of diesel between 1.5 and 2.0. This higher consumption, combined with the cost of additives, tends to make ethanol projects economically unfeasible, which are very important from an environmental point of view.

Another technology for using ethanol in vehicle engines and equipment conventionally operating on a diesel cycle consists of the so-called "ottolization", that is, transforming engines originally running on a diesel cycle to run on an Otto cycle, by adapting a spark plug in a diesel engine cylinder head. Such a conversion, in addition to implying cost and time to be carried out, being difficult to reverse, implies increases in the consumption ratio L/h ethanol/L/h diesel above 2.0, since the Otto cycle has an efficiency of energy conversion about 30% lower than that of the diesel cycle of equivalent power.

Searching the Brazilian and international patent databases, we found the following findings:

The following patents are for diesel alternative fuel blends:

Chinese patents with publication number CN101602968 and CN101434875 disclose options for blending hydrocarbons with ethanol.

Patent CN101580743 discloses a diesel or gasoline fuel composed of a mixture of combustible materials, tar, and solvents derived from industrial or organic waste, 10-50% of alcohols or mixtures that may include butanol, 10-15% of butanol, isopropanol, d-tert-butyl-p-cresol or mixtures thereof, 10-25% ferroanneldiene, or kerosene, solvent oil, mineral oil, lubricating oil, vegetable oil or mixtures thereof. This patent does not substantially employ butanol as the primary fuel.

Patent CN101402887 deals with a substantially ethanol compound (75 to 90%) to act as diesel oil for low temperatures, containing, among other compounds, 2 to 10% of butanol or isobutanol. Butanol basically acts as a co-solvent for the various compounds.

Patent CN101376848 describes an ethanol-diesel mixture, with a proportion between 60-85% of diesel oil. Butanol is used in a content between 0.5 and 1.5%, as a co-solvent to aid in the stability of the resulting emulsion.

US patent US 2009013591 shows a mixture of fuels that includes 15-95% of gasoline or diesel oil, from 5 to 85% of alcohols, including butanol, characterized by the use of glycerin ethers as an additive.

The Chinese patent CN101235325 discloses a diesel oil-methanol mixture, being diesel oil 23-50%, methanol 35-70%, where two among several other constituents are: isobutanol 0-3% and butanol 0-3%.

Chinese patent CN101215483 discloses a diesel-methanol mixture comprising, among other components, 0.25-0.6% tert-butanol.

Patent CN 1800313 discloses an emulsion of gasoline with alcohols and dimethyl ether which may contain 2-3% of 2-butanol.

Patent CN 1730619 discloses an emulsion fuel containing methanol, petroleum, diesel oil, tert-butanol, sorbic alcohol fatty acid ester, polyoxyethylene, and monomethoxypolyethylene.

Patent CN1796513 describes an additive to be added to diesel oil, comprising ethanol, ketones, silicones, n-butanol, and benzyl alcohols.

Patent CN1769398 shows a fuel with 65-80% methanol, which may contain, among others, 5-10% butanol.

Patent CN1590515 describes a fuel formed by mixing diesel oil, benzene, gasoline, butanol and fatty acid ammonium salt.

The following patents are for additives to improve the ignitability of diesel oil or ethanol:

EP 0403516 discloses a polyalkylene glycol additive to be added to hydrated ethanol in a proportion between 12-20%, however the examples show adequate results in polyalkylene glycol contents greater than 17% for conventional engines with typical compression ratios of 18:1.

U.S. Pat. No. 5,628,805 describes an ethoxylated polyol, to be added to hydrated ethanol in a proportion between 5 and 10% v/v. This technology is currently in use in the city of Stockholm (Sweden), and being tested in several cities around the world, applied in Scania engines, through the BEST project (BioEthanol for Sustainable Transportation). However, to be used in the proportion of 5%, an engine specially designed for the fuel is required, with a higher compression ratio than that used in conventional diesel engines. While the compression ratio of conventional diesel engines is around 17:1, the compression ratio of Scania diesel cycle engines dedicated to ethanol is around 24:1. This limits its use to dedicated engines, and prevents the technology from being of the "flex fuel" type, that is, neither the fuel formulated in this way can be used in the wide base of existing conventional engines, nor the engines dedicated to ethanol can be used with the suitable diesel fuels at conventional compression ratios (diesel oil, biodiesel, vegetable oil, etc.).

U.S. Pat. No. 2,378,466 discloses the use of organic nitrates such as ethyl nitrate, ethylene glycol dinitrate (DN-MEG), triethylene glycol dinitrate (DNTEG), tetraethylene glycol dinitrate (DNTetraEG), as additives capable of increasing diesel fuel ignition.

Recently, alternative options for ethanol from renewable sources have emerged. Among the options, 4-carbon alcohols, mainly n-butanol and isobutanol, can be produced by renewable biotechnology processes, with advantages such as a calorific value slightly lower than that of gasoline, greater solubility in hydrocarbons, lower corrosivity, higher flash and boiling points, which makes fuel handling and storage safer and reduces evaporation losses.

The conventional process for the production of butanol by microbiological fermentation is the ABE process (Acetone-Butanol-Ethanol), which employs fermentation of sugars by the bacterium *Clostridium acetobutylicum*. Introduced in the early 20th century by industrial chemist, leader of the Zionist movement and first president of the State of Israel Chaim Weizmann, the process focused on the production of acetone used on a large scale to obtain the explosive Cordite (a double-base gunpowder). Later, the process was supplanted in terms of economic viability by petrochemical processes and fell into disuse.

A currently widely used development line is the genetic modification of bacteria of the genus *Clostridium*, which increases the productivity and selectivity of the ABE process to maximize butanol production. Such a line of development includes, as n-butanol production processes, the U.S. Pat. No. 5,753,474, US 2010143996, US 2010136641, CA 2699378, WO 2010024715, WO 2010024714, GB 2462642, WO 2010017230, US 20 10036174, UK 2375451, CN 101595218, WO 2009149270, KR 2010019127, US 2010086982, WO 2009142541, GB 2459756, CN 101423815, CN 101250496, and JP 60172289.

Canadian patent CA2548221 discloses a new bacterium, *Clostridium carboxidivorans*, which can synthesize biofuels from CO, including ethanol, and catalyze the production of acetate and butanol. It can also directly ferment lignocellulose to produce ethanol or other substances.

US2009275787 and WO2010031793 patents employ modified *Clostridium* bacteria to produce n-butanol from glycerin. This process is of particular interest, since large volumes of glycerin are obtained in the process of transesterification of fatty acids (biodiesel production), and there is no demand for the expected volume of glycerin that should enter the Brazilian market due to the increase in biodiesel content in diesel oil.

US patent 2010093020 employs bacteria of the genus *Enterococcus* genetically modified for optimized production of butanol.

WO 2009122192 employs, for the production of butanol, genetic modification of bacteria from the Bacillaceae family, preferably *Geobacillus* or *Ureibacillus*.

WO 2009082690 employs modification of the genetic code of different bacteria for the production of butanol.

Patents US 2010143985, US 2010129885, US 2010062505, WO 2009140159, WO 2009013159 disclose, for the production of butanol, genetically modified yeasts. Yeasts have the advantage of being normally used for ethanol production, making the process adaptation of existing sugar and alcohol plants easier.

Canadian patent CA 2691998 employs genetic modification of bacteria or yeast to produce butanol.

WO 2009105733 discloses a photosynthetic process using plants, algae, blue-green algae, which can produce butanol directly from CO2 and water. In this way, there is a direct sequestration of carbon from the atmosphere, with better use of energy in the process, and reduced competition between the biofuel production process and food production.

Patent KR 20090025221 shows a process that uses algae to generate biomass, and then transform it into alcohols or ketones, including butanol.

WO 200900346 discloses a process that converts CO2 into gases, and subsequently uses fermentation of these gases to obtain products, including butanol.

WO 2009103533, CA 2684860, WO 2009086423, and WO 2010037111 disclose modifications in yeast for isobutanol production.

WO 2009149240 discloses a process for producing isobutanol from fermentation of biomass by bacteria of the *Escherichia coli* species.

The following patents disclose unspecified cells modified for butanol and ethanol production: WO 2009013160, US 2009176288, WO 2009082148, WO 2008124523, WO 2009059254, and WO 2008143704.

Patent WO 2009078973 presents genetic modifications in microorganisms for the production of several valuable products, including butanol, from free fatty acids.

Patent CN 101358187 envisages using gamma radiation to modify cells or protoplasts to increase the yield of butanol production.

Several processes employ conventional microorganisms from fermentation processes without genetic modification, but optimize the yield of the industrial process for obtaining butanol, or the process of separating butanol from the fermentation broth, which increases yield, as even low levels of butanol make it the fermentative medium toxic to alcohol-producing microorganisms. As patents that reveal process changes we can mention: NL 10355651, KR 100556322, WO 2010011769, CN 201367402, US 2008274524, WO 2010000649, US 2010105115, WO 2009106835, WO 200911 2335, WO 2009100434, CN 101475932, US 2009162912, WO 2009087680, WO 2009079362, CN 101418320, CN 101397236, CN 101429527, WO 2009062601, US 2009017514, CN 101363031, WO 2009021503, CN 101333545, WO 2009 008616, WO 2008154301, CN 101302545, CN 101250561, WO 2008124490, CN 101333545, CN101457238, DE 102006060610 and WO 2009079213.

Patent CN 101165188 demonstrates the production of butanol from ground cassava or cassava starch.

US patent 2010087687 discloses a process for using plant and animal biomass or municipal waste, which includes butanol among the products.

Patent MX 2009006782 shows a process to produce biofuels, which includes biobutanol, from enzymes.

WO 2009128644 shows a metabolic network model for analyzing the metabolic characteristics of butanol-producing microorganisms, and methods for selecting or modifying microorganisms in order to obtain metabolic products with high efficiency.

Several patents present the approach of, starting from biologically produced ethanol, to produce butanol chemically.

US 2010058654, JP 2009220105, WO 2009097312, KR 20090009330, JP 2008088140, and RU 2191769 patents disclose catalysts for processes that can convert ethanol produced from renewable sources into butanol.

Patent 20150166443 uses gallium catalysts to produce higher alcohols, between 4 and 8 carbons, from ethanol, which can be of biological origin.

Although it is desirable that butanol becomes an economically viable fuel produced from renewable and biological sources (so-called biobutanol), solutions for petrochemical processes for obtaining butanol are still patented:

US patent 2010048960 discloses a process to produce butanol from butane.

US patent 2009239275 shows a process for petrochemically producing 2-butanol.

WO 2005108593 discloses an enzymatic catalyst for the production of 2-butanol from 2-butanone.

Patent KR 20080106516 discloses a process for producing butanol from butene.

Patent MX 2009008416 discloses a process for the production of several alcohols, including n-butanol and isobutanol.

The following patents reveal fuels that use butanol as part of their composition:

US patent 2010005709 demonstrates a mixture of ethanol, isopropanol, and sec- or tert-butanol, not more than 3% methanol and not more than 15% C5 or greater. The production process is a petrochemical process of the Fischer-Tropsch type (obtaining alkanes from carbon monoxide and hydrogen), and the mixture is used as fuel for Otto cycle engines (gasoline).

US patent 2009277079 discloses a mixture to be used as gasoline of butanol isomers with good cold start.

WO 2009120042 shows a process to chemically produce butyl butyrate from butyric acid and butanol from fermentation. The ester can be used as biodiesel.

WO 2009114752 presents a process to use xenobiotic materials that are carbon sources, to produce biomass and/or biogas from microorganisms that degrade carbon sources, and then use microorganisms to synthesize biofuels. One of the mentioned biofuels is butanol.

WO 2009106647 discloses an engine with compression ignition comprising two injection systems, where one system injects diesel or biodiesel, and the other injects a fuel more volatile than diesel, such as hydrogen, LPG, natural gas, ethanol, propanol or butanol. Such bi-fuel hybrid systems have recently been presented to the market by several companies, always with a utilization ratio between the two fuels close to 50%/50%, with some disadvantages: need for two fuel tanks, separate transport/supply logistics for two fuels, a sophisticated variable fuel injection control system according to the required power load, and the purchase by the user of an injection system modification kit.

US patent 2009151232 discloses a light diesel oil composition containing between 9 and 20% of butanol, 0.4 to 4% of butyl nitrate or nitrite, and the rest of base for light diesel oil, that is, it employs a substantial amount (between 90.6 and 76%) of diesel oil derived from petroleum.

Patent CN 101402888 presents an additive compound and a methanol diesel fuel, containing, among others, 1 to 10% of n-butanol. n-Butanol acts as a co-solvent, but substantially the fuel is composed of methanol, which has a low calorific value and is extremely toxic.

Patent KR 20090003 146 demonstrates a mixture to replace gasoline (Otto cycle engines), composed mainly of ethanol or methanol, containing between 5 and 8% of butanol.

Patent CN 101240199 shows an alcohol-ether mixture (65 to 70%), where the alcohol is a mixture of methanol, butanol and acetone, and the ether is the mixture of any 2 ethers comprising dimethyl ether, isopropyl ether or methyl tert-butyl ether (MTBE).

US patent 2010005709 discloses a process to produce alternative fuels, which includes obtaining synthesis gas from renewable sources, converting this gas into olefins with a chain substantially between C2 and C4, and hydrolyzing these olefins. The resulting mixture of alcohols contains butanol and must be mixed with gasoline.

Patent MX 2007010015 presents a mixture of alcohols from C1 to C5 or C1 to C8, with more ethanol than methanol, with a higher octane rating than ethanol, that is, to replace gasoline.

Patent CN 101085938 discloses a synthetic biofuel with 10-50% petroleum-derived fuel such as naphtha, dimethyl ether and gasoline, 4.5-10% of one or more of the list including ether, acetone or butanol.

Patent CN 1884440 deals with the production of tert-butyl fatty acid ester (biodiesel), using tert-butanol as a transesterification reagent.

Patent JP 2004285346 comprises a fuel to replace gasoline, composed of ethanol, and at least two compounds from the group consisting of diisopropyl ether, methyl tert-butyl ether, ethyl tert-butyl ether, dipropyl ether, tert-butanol, dibutyl ether and diethyl ether.

Patent KR 20040044677 discloses an alternative fuel composed of 50-80% of coal mixed liquid extract extracted from bituminous coal, 10-20% of ethanol or methanol from coal liquefaction, 5-15% of n-butanol extracted from liquefaction from coal, and 5-10% of toluene extracted from coal liquefaction.

Patent KR 20020009543 presents an alcohol-based fuel to replace gasoline composed of, among others, 5-15% of butanol.

Patent KR 20030006529 comprises a fuel for internal combustion engines, Otto cycle, composed, among others, of 3-7% of butanol.

Patent RU 2148075 shows compositions based on diesel oil, containing 0.0065-0.0075% of oligoethylhydride siloxane and 0.0025-0.0035 wt % butanol.

WO 9324593 discloses a diesel fuel containing between 10 and 35% ethanol in mixture with diesel oil, also containing butanol and an alkyl peroxide.

Patent KR 930011071 deals with a fuel in emulsion of 1000 parts of petroleum (gasoline?), 15-70 parts of siloxane or oxosilane, 100-300 parts of butanol, 3-7 parts of methanol, 10-20 parts of polyethylene glycol, and 1-3 parts non-ionic surfactant.

Patent JP 2022388 presents a fuel in the form of an emulsion of an alcohol (methanol, ethanol, or butanol), benzene, toluene or xylene, and a fraction rich in aromatics from the distillation of catalytic cracking fluid from an oil refinery.

European patent EP 0171440 discloses a motor fuel based on a fuel composed basically of hydrocarbons, which additionally contains alcohols, and optionally ethers, ketones, aromatics, additives and lead compounds, and may contain 0-10% of butanol.

Patent CA 1221539 describes a stable composition of gasoline and ethanol, containing an additional alcohol, which can be, among others, n-butanol and isobutanol.

U.S. Pat. No. 4,526,586 comprises microemulsions from vegetable oil, a C1-C3 alcohol, water and 1-butanol as a non-ionic surfactant.

GB 2090612 shows a mixture for use as a diesel oil containing between 10 and 60% by volume of gas oil, 10-60% of a C1-C8 alkyl ester of a C12-22 fatty acid, and 10-50% of a mixture containing at least n-butanol and acetone.

U.S. Pat. No. 4,398,920 deals with a mixture fuel containing: (a) a gasoline, a gas oil, or a fuel oil, (b) a mixture of butanol and acetone, optionally containing isopropanol and/or ethanol; and (c) methanol, where the butanol/acetone mixture (b) is prepared by fermentation by suitable organisms such as bacteria or fungi.

U.S. Pat. No. 4,368,056 discloses a fuel formed by mixing butanol obtained by fermentation and glycerides obtained by fermentation, where the substrates are industrial waste, such as cheese yeast, corn cobs, wood chips, etc.

U.S. Pat. No. 4,300,912 describes a synthetic fuel composed of long-chain macromolecules formed by distillation links of methanol, butanol and a kerosene-type oil with a colloidal stabilizer.

In all these patents, the use of alcohol isomers of butanol as fuel for Otto cycle engines, that is, suitable for spark ignition, or fuel mixtures for diesel cycle engines that eventually contain butanol or its alcohol isomers, but never with butanol and alcohol isomers as main fuels.

Butanol, isobutanol or other alcohol isomer of butanol, by itself, does not have diesel-like characteristics, which are necessary to function properly in diesel cycle engines, as shown below:

Butanol and its isomers have a high-octane rating, that is, resistance to detonation by compression, a characteristic that is very desirable in fuels for Otto cycle engines, but opposite to the desirable characteristic for fuels for diesel cycle engines. On the contrary, diesel fuels must have a high number of cetanes, that is, a greater explosiveness when started by compression. The specifications of the diesel oil used in Brazil require a cetane number equal to or greater than 42, according to ASTM D 613 (measurement in a single-cylinder engine type CFR) or ASTM D 6890 (measurement of ignition delay in a combustion chamber of constant volume type IQT). Low cetane numbers mean that it is difficult to start the engine cold, or even that the fuel does not ignite under compression, with total engine stoppage and accumulation of unburned liquid fuel inside the engine cylinder.

Butanol and its isomers, despite having a similar viscosity to diesel oil, do not have lubricity comparable to diesel oil, especially those types of diesel oil with a high sulfur content. Low lubricity wears out the injection systems, in particular the rotors of "common rail" injection pumps, where the pressures and friction efforts are very high, locks exhaust valves, causes premature wear and "fluttering" of rings, that is, a series of deleterious effects on the components of the injection systems and on the engines. According to Brazilian standards, diesel oil must present a maximum wear of 460 µm in the HFRR lubricity test (High Frequency reciprocating Rig), according to ASTM D 6079.

Alcohols, despite the fact that butanol and its isomers present a lower corrosive aggressiveness when compared to hydrated ethanol, present a greater corrosion of materials when compared to diesel oil, generating wear problems to the materials of the injection system.

Alcohol isomers of butanol are oxidized by oxygen in the air during storage, generating butyric acids, which have an extremely unpleasant odor, which can be resolved by adding an antioxidant additive.

Brazilian patent PI 10630-5, owned by the inventor of the present patent, brought an option to allow the use of 4-carbon alcohols through an optimized formulation that uses a series of cetane-improving products, including triethylene glycol dinitrate, tetraethylene glycol dinitrate, isoamyl nitrate, among others, capable of increasing the explosiveness of the combustible mixture, in addition to lubricants, stabilizers and anticorrosives. However, the products used as the main additive to improve cetanes are still derived from petroleum, which makes this fraction of the fuel come from a non-renewable carbon source, in addition to having a higher production cost. The present patent expands the range of cetane-improving products through products of our own synthesis and previously never used as fuel additives, as well as expanding the range of alcohol-based renewable diesel cycle fuel formulations.

With the increased use of biodiesel based on fatty acid esters, the chemical market was impacted by a large supply of glycerin, a by-product of the biodiesel industry. This generated a surplus volume of glycerin compared to demand, which brought the opportunity for syntheses that use glycerin of vegetable origin, renewable, and of low cost, in products that add value to this chain.

Among the recently developed products derived from vegetable glycerin are glycol ethers. This class of compounds can be conveniently synthesized from glycerin and alcohols, such as ethanol and butanol, by replacing one or more hydroxyls of glycerin with ether radicals. Since glycerin can be of vegetable origin, as well as alcohols, the compound can be considered a renewable source.

Polyglycols are a class of polymeric compounds (polyethers) obtained from the polymerization of epoxide units, such as ethylene oxide or propylene oxide, or glycol monomers, such as ethylene glycol or propylene glycol. Polyglycols can also be produced from a renewable source, either by dehydration of alcohols obtaining alkenes, and subsequent oxidation of alkenes, obtaining epoxides, such as dehydration of ethanol, obtaining ethylene, followed by oxidation of ethylene, obtaining oxide of ethylene.

A renewable diesel fuel formulation based on alcohols, object of the present patent, was developed to offer an alternative energy supply for systems started by compression, from a renewable biological source, with advantages of replacing fossil sources, reducing emissions of carbon compounds, adequate consumption, compatible cost, maintenance of the useful life of the system's components, greater safety and reduced evaporation losses. The fuel of the present patent is capable of replacing diesel oil, is based on substantial proportions of 4-carbon alcohol, such as n-butanol, isobutanol, sec-butanol and tert-butanol and is an alternative coming from renewable sources, produced in sugar and alcohol plants, and can remove the fossil fuel used in large quantities in the sugar and ethanol production cycle, in irrigation motor pumps, tractors, sugarcane transport trucks, sugarcane harvesters, tractors and support trucks. Another interesting application will be as fuel for urban buses, as the environmental laws of several states and municipalities in Brazil include ambitious targets for reducing the use of fossil fuels.

The original and novel concept of the invention stemmed from the inventor's prior experience regarding the relative effectiveness of cetane-enhancing agents, lubricants, and anti-corrosion agents. According to his previous research, cetane enhancers, which promote the explosion of the air-fuel mixture by compression, consequently reducing the ignition time (the time elapsed between the fuel injection and its effective detonation), act through bond breaking mechanisms molecules, either by oxidation-reduction internal to the molecule, or by formation of free radicals, or by cleavage. The relevant literature explains part of these mechanisms. An important source is the article "How Do Diesel-fuel Ignition improvers Work?" by PQE Clothier et allii, from York University, Toronto, Canada, published in Chemical Society Review in 1993.

As a typical example of compounds subject to oxidation-reduction reactions internal to the molecule, we can mention organic nitrates, as an example of compounds subject to free radical formation reactions we can mention organic peroxides, and as an example of compounds subject to cleavage, ethers and polyether.

From the experimental observations of the author of this patent over more than 20 years of research with cetane improvers, lubricants and anticorrosives, it would be possible to find a synergy between mechanisms. of the air-fuel mixture under compression, which surprisingly made it possible to reduce the percentage of cetane improver needed, as well as allowing the use of a cetane improver compound as a lubricant. This synergy makes it possible to reduce production costs, as nitrates are generally more expensive than polyglycols.

Another objective of the present invention was to provide a fuel whose characteristics are as similar as possible to those of diesel oil derived from petroleum, in order to provide its use in any currently available diesel engine, practically without modifications. The only change envisaged is an increase in the delivery of the injection pump, to compensate for the increase in consumption, which from previous experience will be around 15% to 20%.

The basis of the invention consists in combining the 4-carbon alcohol with an organic dinitrate ester compound, derived from glycerine glycol monoether, or a polyethylene glycol nitrate, either of these in synergistic combination with a polyglycol. The final effect was surprising, the synergistic mechanism is not fully explained, but it can be attributed perhaps to the interaction between the acidic nitrogen oxides formed in the gas phase by the nitrate, and the polyglycol, where the nitrogen oxides catalyze the cleavage of the CO bonds of the polyglycol, forming highly reactive carbocations.

Glycolic ether can be synthesized from vegetable glycerin and n-butanol, by reactions known in the industry, and which are not the subject of this patent. Polyglycol can conveniently be produced from ethanol via dehydration, oxidation, and polymerization, or any other process known in the industry.

Dinitrates, later tested as possible cetane-enhancing products for butanol, were synthesized in the following ways:

Glycol Ether Dinitrates were obtained as a mixture consisting of:

3-butoxy-1,2-propanediol dinitrate: 85%
2-butoxy-1,3-propanediol dinitrate: 15%

The mixture was obtained by reaction of nitration in mixed acid, separation and purification of nitrates, by the following procedure:

Preparation of a 99% nitric acid and acetic anhydride mixture, in the proportion of 40% nitric acid and 60% acetic anhydride, by mass;

Cooling, under agitation, of 920 g of this mixture;

Dropwise addition of 100 g of glycol ether, mixed in the proportion of 85% of 3-butoxy-1,2-propanediol and 15% of 2-butoxy-1,3-propanediol, under intense stirring and cooling, maintaining a maximum temperature of 5° C.;

Separation of nitrates formed by adding 3000 mL of distilled water;

Removal of the nitrate fraction in a separating funnel;

Washing of the resulting nitrate 5 times in 3000 mL of water for each wash, at room temperature;

Separation of the nitrates formed in a separating funnel.

A polyethylene glycol dinitrate was also synthesized by the following procedure:

Preparation of a 99% nitric acid and sulfuric oleum mixture (sulfuric acid with 34% free $SO_3$), in the proportion of 70% nitric acid and 30% oleum, by mass;

Cooling, under agitation, of 167 g of this mixture;

Dropwise addition of 180 g of polyethylene glycol with an average molecular mass of 200 daltons, under intense agitation and cooling, maintaining a maximum temperature of 5° C.;

Separation of nitrates formed by adding 3000 mL of distilled water;

Removal of the nitrate fraction in a separating funnel;

Washing of the resulting nitrate 5 times in 3000 mL of water for each wash, at room temperature;

Separation of the nitrates formed in a separating funnel.

The purified products mentioned above were used in mixtures with 4-carbon alcohols, in performance tests as described below:

Test I: Ignition delay test in a single-cylinder engine, with the following methodology:

Stationary diesel engine
  Brand: RAX
  Model: RD7
  Manufacturer: Motoren u. Maschinenfabrik Felix Renauer (Austria)
  Characteristics: Single-cylinder, single-acting, indirect injection diesel engine
  Volumetric compression ratio 16.8:1.0
  Power: 7 hp at 1400 RPM
Electric Generator, coupled to the engine to give Effective Load
  Brand: Sociedade Industrial Máquinas Elétricas "LEMIS"
  Model: GA 15/12
  Power: 3 kVA 220/110V; 13.5/27 A at 1500/1800 RPM
  Coupling: Flat Belt with transmission ratio of 1:1.83
  Effective charge controlled by rheostat and dissipated in brine tank.
Data acquisition system
Combustion chamber pressure
  Piezoelectric Sensor for 250 Kgf/cm$^2$
  Brand: Kistler AG.
Injection line pressure
  Inductive Sensor for 350 Kgf/cm$^2$
  Brand: Hartmann & Braun
Recording of pressure signals
  4 Channel Digital Oscilloscope, 100 MHz
  Brand: Agilent, model DSO 6014 A
Test Methodology Pressure variations inside the cylinder (combustion chamber) and in the high-pressure pipe of the injection system were carried out with two pressure transducers;

The signals coming from the transducers are amplified, treated and then sent to the oscilloscope;

The oscilloscope was adjusted so as to indicate, on its vertical scale, the pressure variations inside the cylinder (combustion chamber) and the pressure in the high-pressure piping of the injection system. The time difference between the pressure peak in the injection system, indicating opening of the injector needle, and the beginning of the pressure peak inside the combustion chamber, indicative of fuel detonation, is measured as the delay time of ignition.

The control of the applied load was carried out by the rheostat controlling the excitation of the electric generator, determining the readings of voltage (Volts) and electric current (Ampères) allowing the calculation of the effective load applied to the engine by means of the generator.

The loads applied to the motor were determined, having as maximum limits generated electrical powers of the order of 2.8 hp.

Test II: Diameter of wear scar on steel ball to evaluate lubricity in HFRR equipment (High Frequency reciprocating Rig), according to ASTM D 6079;

The tests were carried out comparatively to diesel oil, in order to select the ranges of contents optimized in efficiency for the tested additives. The aim was to obtain an ignition delay similar to or less than the ignition delay of unloaded and loaded diesel, and from previous experience an ignition delay of no more than 5% greater than that of diesel under the same conditions was established as a standard. Therefore, a maximum delay of 1.05 ms in the no-load condition and 1.32 ms in the loaded condition, and an HFRR lubricity with a maximum scar diameter of 460 μm was established as a limit for choosing the appropriate formulation.

TABLE I

Ignition efficiency test results:

| Test No. | Composition % v/v | Test I: Ignition delay (ms) No charge | Test I: Ignition delay (ms) with charge | Test II: HFRR scar (μm) |
|---|---|---|---|---|
| 1 | metropolitan diesel oil | 1.0 | 1.28 | 400 |
| two | n-butanol 97.5% 85/15 mixture 3-butoxy-1,2-propanediol dinitrate/2-butoxy-1,3-propanediol 2.5% | 1.3 | 1.58 | — |
| 3 | n-butanol 97% mixture 85/15 3-butoxy-1,2-propanediol dinitrate/2-butoxy-1,3-propanediol dinitrate 3.0% | 0.96 | 0.96 | 840 |
| 4 | n-butanol | does not start | | 822 |
| 5 | Isobutanol 98% mixture 85/15 3-butoxy-1,2-propanediol dinitrate/2-butoxy-1,3-propanediol 2% | 1.38 | 3.2 | — |
| 6 | Isobutanol 97% mixture 85/15 3-butoxy-1,2-propanediol dinitrate/2-butoxy-1,3-propanediol dinitrate 3.0% | 1.05 | 1.2 | |
| 7 | n-butanol 97% mixture 85/15 3-butoxy- | 0.9 | 0.9 | 410 |

TABLE I-continued

Ignition efficiency test results:

| Test No. | Composition % v/v | Test I: Ignition delay (ms) No charge | Test I: Ignition delay (ms) with charge | Test II: HFRR scar (μm) |
|---|---|---|---|---|
| 8 | 1,2-propanediol dinitrate/ 2-butoxy-1,3-propanediol dinitrate 2.0% polyethylene glycol with average molecular weight 2000 daltons 1.0% isobutanol 97.2% | 1.04 | 1.04 | 396 |
| 9 | mixture 85/15 3-butoxy-1,2-propanediol dinitrate/ 2-butoxy-1,3-propanediol dinitrate 1.8% polyethylene glycol with average molecular weight 2000 daltons 1.0% n-butanol 97% polyethylene glycol with average molecular weight 2000 daltons 3.0% | does not start | — | — |
| 10 | n-butanol 97.2% polyethylene glycol dinitrate 200 daltons 1.8% polyethylene glycol with average molecular weight 2000 daltons 1.0% | 0.92 | 1.16 | 380 |

Surprisingly, blends based on butanol and isobutanol that used polyethylene glycol as a lubricant also had ignition delay equal to or less than diesel with substantially lower nitrate contents than blends that only contained nitrate. As confirmation of the synergistic effect, mixtures containing similar proportions of polyethylene glycol only without nitrates did not even detonate upon compression. Polyglycol was also effective as a lubricant, reducing the HFRR test scar to diesel-like levels.

Based on the research and tests carried out, the optimized formulation of this patent was obtained, which consists of the following:
  between 90 and 99% of a 4-carbon alcohol fuel, such as n-butanol, isobutanol, sec-butanol and tert-butanol;
  between 1 and 10% of one or more nitrates capable of increasing the explosiveness of butanol, such as:
    1% to 5% 3-butoxy-1,2-propanediol dinitrate;
    1% to 5% 2-butoxy-1,3-propanediol dinitrate;
    0% to 5% polyethylene glycol dinitrate with an average molecular weight of 200 daltons.
  between 0.005% and 3.0% of a polyglycol that acts as a lubricant, such as polyethylene glycol with an average molecular weight of 2000 daltons.

It will also be convenient that the mixture contains complementary performance additives, already disclosed in patent PI 10630-5, owned by the author of the present patent, that is, a stabilizing additive (controller of the hydrolysis of nitrates) such as: diphenylamine, diphenylureas (such as ethyl centralite), morpholine, or other weakly alkaline compounds, one or more anti-corrosive additives that act by forming an adsorbed film on metallic surfaces, commercially available, such as: polyether-based mixture keropur MFlex 3651, mixture based on carboxylic acid amide KeroKorr 3232, both from BASF AG, Tolad 3224 or Tolad 3222, both from Baker Hughes.

It is also evidenced by the tests so far, that other alcohols or mixtures of alcohols can be used together with the synergistic additives of the present patent, without losing the new and surprising effect disclosed here.

The invention claimed is:

1. A formulation and cetane improvement based on organic nitrates for alcohol-based renewable diesel fuel, said formulation comprising:
   between 90 and 99% of a 4-carbon alcohol fuel;
   between 0% to 5% polyethylene glycol dinitrate with an average molecular weight of 200 daltons; and
   between 1% and 10% of organic nitrates for increasing the explosiveness of butanol, said organic nitrates comprise at least one of 3-butoxy-1,2-propanediol dinitrate, or 2-butoxy-1,3-propanediol dinitrate.

2. The formulation according to claim 1, further comprising:
   1.01% to 3.0% of polyethylene glycol with an average molecular weight of 2,000 Daltons.

3. The formulation according to claim 1, wherein said 4-carbon alcohol fuel comprises at least one of n-butanol, isobutanol, sec-butanol or tert-butanol.

4. The formulation according to claim 1, wherein said organic nitrates comprise 1% to 5% of said 3-butoxy-1,2-propanediol dinitrate and 1% to 5% of said 2-butoxy-1,3-propanediol dinitrate.

5. The formulation according to claim 1, wherein said organic nitrates comprise 18 to 5% of said 3-butoxy-1,2-propanediol dinitrate or 1% to 5% of said 2-butoxy-1,3-propanediol dinitrate.

6. The formulation according to claim 1, wherein said 3-butoxy-1,2-propanediol dinitrate and said 2-butoxy-1,3-propanediol dinitrate are provided in a proportion of 85/15, respectively.

* * * * *